United States Patent [19]

Miura et al.

[11] Patent Number: 4,689,778

[45] Date of Patent: Aug. 25, 1987

[54] OPTICAL DISC RECORDING/REPRODUCING APPARATUS WITH RECORDED TRACK-SECTION DETECTOR

[75] Inventors: Yoshio Miura, Yokohama; Yukio Fukui, Machida, both of Japan

[73] Assignee: Hitachi, Ltd., Tokyo, Japan

[21] Appl. No.: 805,100

[22] Filed: Dec. 5, 1985

[30] Foreign Application Priority Data

Dec. 6, 1984 [JP] Japan .................. 59-256535

[51] Int. Cl.[4] ...................... G11B 19/04; G11B 7/085; G11B 7/095
[52] U.S. Cl. ........................................ 369/32; 369/54; 369/44; 360/72.1; 360/78
[58] Field of Search .................. 369/32, 144–146, 369/54, 58; 360/72.1, 78

[56] References Cited

U.S. PATENT DOCUMENTS

| | | | |
|---|---|---|---|
| 4,489,406 | 12/1984 | Hsieh et al. | 369/44 X |
| 4,550,393 | 10/1985 | Sugiyama et al. | 369/32 |
| 4,580,253 | 4/1986 | Yoshidome | 369/32 |
| 4,598,394 | 7/1986 | Nonaka | 369/32 X |
| 4,606,016 | 8/1986 | Verboom et al. | 369/54 |
| 4,615,023 | 9/1986 | Inada et al. | 369/32 |

FOREIGN PATENT DOCUMENTS 0083475 7/1983 European Pat. Off. .
0089020 9/1983 European Pat. Off. .

OTHER PUBLICATIONS

Hashimoto, "Recorder or Reproducer", Patents Abstracts of Japan, vol. 8, No. 179, 8/84.
Yamashita, "Optical Disc Reproducer", Patents Abstracts of Japan, vol. 17, No. 241, 10/83.
Deguchi, "Optical Type Recorder and Reproducer", Patents Abstracts of Japan, vol. 6, No. 252, 12/82.
Yamaguchi, "Optical Disk Device", Patents Abstracts of Japan, vol. 8, No. 121, 6/84.
Yoshida, "Optical Recording and Reproducing Unit", Patents Abstracts of Japan, vol. 4, No. 142, 10/80.
Hirasawa, "Optical Recording and Reproducing Device", Patents Abstracts of Japan, vol. 7, No. 10, 1/83.

Primary Examiner—Aristotelis M. Psitos
Assistant Examiner—Wayne R. Young
Attorney, Agent, or Firm—Antonelli, Terry & Wands

[57] ABSTRACT

In the case where an information signal is optically recorded on the tracks of a disc-like recording medium, the apparatus of the invention confirms that no information signal is recorded on the track prior to recording the information signal in order to prevent the overlap recording of the information signal. This apparatus has a track jump pulse generating circuit and an RF signal detecting circuit and the light spot sequentially moves to the adjacent tracks by a plurality of times during one rotation of the track. The presence or absence of an RF signal is detected from each track and the presence or absence of the recorded track is checked at a high speed.

6 Claims, 16 Drawing Figures

OPTICAL DISC RECORDING/REPRODUCING APPARATUS WITH RECORDED TRACK-SECTION DETECTOR

BACKGROUND OF THE INVENTION

The present invention relates to an optical recording-/reproducing apparatus for recording an information signal such as a video signal on a disc-like recording medium as a format of a change in optical characteristic of a material of the medium or reproducing the recorded information signal from the recording medium and, more particularly, to an apparatus having an overlap recording preventing circuit for preventing that in the case of recording an information signal on the medium by such an apparatus, this information is overlappingly recorded in the portion on the medium where the information has already been recorded.

In an optical recording/reproducing apparatus, in general, a disc-like recording medium is used and an information signal is recorded as spiral or coaxial recording loci on the disc or reproduced therefrom.

The disc having coaxial recording loci is suitable for recording and reproducing still image information. On the other hand, the disc having spiral recording loci (hereinafter, referred to as tracks) is suited to record and reproduce continuous signals such as a video signal of an animation or the like and audio signals or the like.

Although an information signal can be easily continuously recorded on the spiral tracks, it is necessary to take measures to prevent a new information signal from being overlappingly recorded on the portion where the information signal has already been recorded in the case where information is recorded on the track sections of a few turns and the recording is once interrupted and thereafter the recording of new information is restarted or where an additional signal is newly recorded on a plurality of track sections on the recording medium on which the information signal has already been recorded, or the like. One track section denotes the portion of one turn of the tracks.

As measures to prevent such overlap recording, for example, there has been known an apparatus shown in the Official Gazette of Japanese Patent Unexamined Publication No. 147141/82. This apparatus intends to first detect reproduced RF (radio frequency) signals from a plurality of objective track sections on which an information signal is recorded. When no reproduced RF signal is detected, those track sections are determined to be the sections where no signal is recorded and the information signal is recorded on those track sections.

The conventional apparatus as shown in this Official Gazette detects the final ends of the recorded track sections; therefore, in the case where the number of recorded track sections is large, it takes a long time to check them.

SUMMARY OF THE INVENTION

It is an object of the present invention to provide an apparatus for preventing the overlap recording in an optical recording/reproducing apparatus in which in the case of additionally recording a continuous signal on a plurality of rotational tracks on the disc, the overlap recording can be certainly prevented without needing a long time to check the unrecorded portion nor erroneously detecting the portions where the signals have already been recorded as the unrecorded portions.

According to the present invention, prior to starting the recording of the video signal onto the track sections of a plurality of turns, a part of each of a plurality of track sections designated is checked to see if the signal has already been recorded or not. Namely, in this invention, all parts of each track section are not necessarily checked.

In other words, the light spot sequentially jumps from within the track section where the spot is located to the outer track section adjacent to that track section, thereby detecting the presence or absence of the reproduced RF signal from a part of each track section while moving at a high speed. In the case where the video signal has already been recorded in a part of the track section designated, it is decided that the video signal has been recorded on the whole track section. If no RF signal is detected from a part of the track section, it is determined that no video signal is recorded on the whole track section, so that the recording of the video signal is started. Assuming that a rotational period of the disc is T (sec) and a jump period of tracks is $T_1$ (sec), the number N of track jump times per rotation of the disc can be expressed by $$N = T/T_1$$

According to the invention, to prevent omission of detection of the recorded tracks, a track jump pulse is generated synchronously with a detection signal of a mark for matching the information recording position written on the disc. Also, the N-th track jump operation is not performed unless otherwise specified.

DESCRIPTION OF THE PREFERRED EMBODIMENTS

An embodiment of the present invention will now be described with reference to the drawings.

Figure 1:
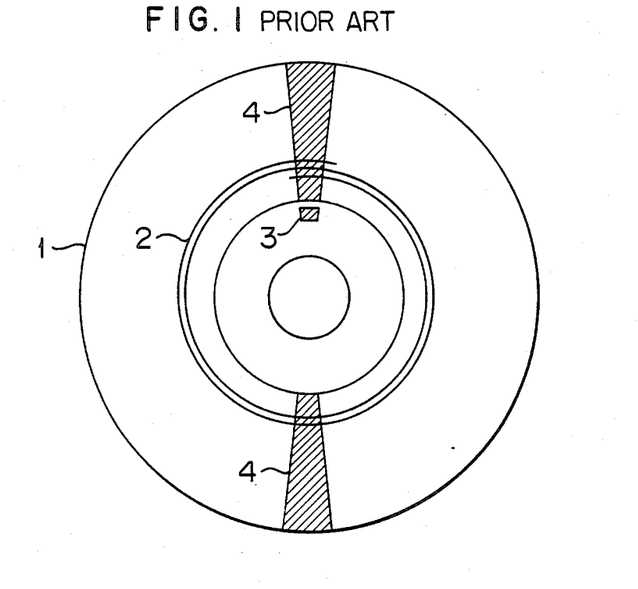
FIG. 1 is a diagrammatical view of a disc.

FIG. 1 is a diagrammatical view showing an example of discs for use in the present invention, which have conventionally been well known.

As illustrated in the diagram, a grooved track 2, address areas 4 in which an address signal peculiar to each track section of the track 2 is stored, and a mark 3 which is used to match the recording start position for every track section are formed on the disc 1 when it is manufactured. In the diagram, only the spiral track 2 is shown for simplicity of explanation; however, it may be coaxial tracks.

Figure 2:
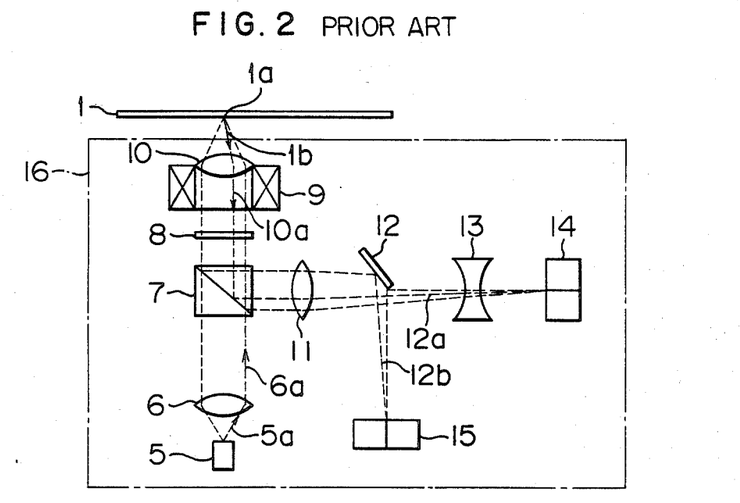
FIG. 2 is an arrangement diagram of an optical head.

FIG. 2 is a diagrammatical view showing an arrangement of an optical head 16 which is used to record and reproduce an information signal in this invention, which has conventionally been well known.

In FIG. 2, is a light beam 5a irradiated from a laser diode 5 is converted to a parallel light beam 6a by a collimator lens 6 and passes through a deflecting beam splitter 7 and a ¼ wavelength plate 8. This light beam is focused as a light spot 1a onto the disc 1 by an objective lens 10 attached to an actuator 9.

A reflected light 1b from the disc 1 is again converted to a parallel light beam 10a by the objective lens 10 and passes through the ¼ wavelength plate 8. Thereafter, the light beam 10a is reflected by the deflection reflecting surface of the beam splitter 7 and passes through a convex lens 11. The light flux of the light beam 10a is divided by a mirror 12 into half and one light flux 12a passes through a concave lens 13 and enters a photo cell 14 to detect a focusing error. The other light flux 12b enters a photo cell 15 to detect a tracking error.

Figure 3:
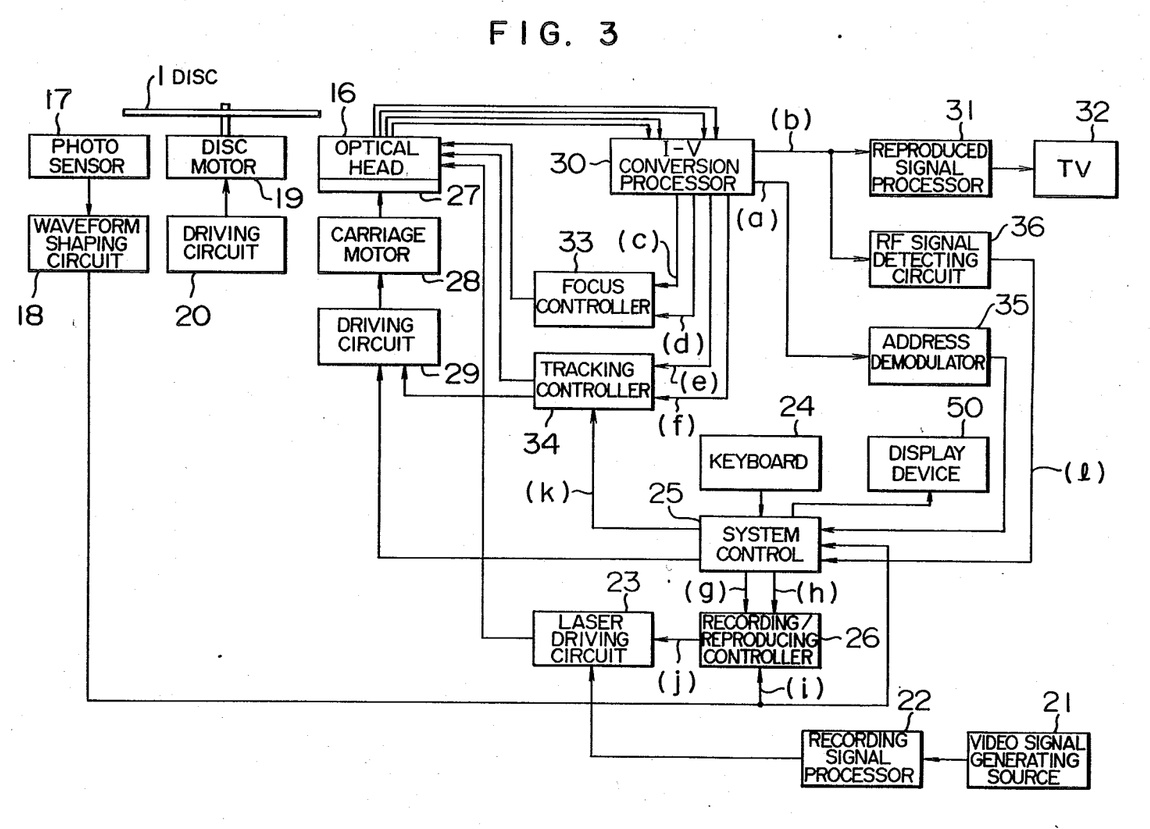
FIG. 3 is a block diagram showing the first embodiment of an optical recording/reproducing apparatus of the present invention.

FIG. 3 is a block diagram showing an example of an optical recording/reproducing apparatus to which the invention is embodied.

In FIG. 3, reference numeral 1 denotes the disc; 17 a photo sensor to detect the mark for matching the recording position; 18 a waveform shaping circuit; 19 a disc motor; 20 a disc motor driving circuit to control the disc motor 19 such that one rotation of the disc 1 corresponds to one frame of the video signal; 21 a video signal generating source such as a TV camera or the like; 22 a recording signal processor; 23 a laser driving circuit; 24 a keyboard to change over the operating condition of the apparatus into the recording or reproducing mode or to input the number of recording tracks or the like; 25 a system control circuit consisting of a microcomputer or the like; 26 a recording/reproducing control circuit; 27 a carriage on which an optical head 16 (which has already been described in detail with reference to FIG. 2) is mounted; 28 a carriage motor to move the carriage 27 in the radial direction of the disc 1; 29 a carriage motor driving circuit; 30 an I-V conversion processor; 31 a reproduced signal processor; 32 a TV receiver; 33 a focus control circuit; 34 a tracking control circuit; 35 an address demodulator; and 36 an RF detecting circuit to detect the presence or absence of a reproduced RF signal.

The video signal generated from the video signal generating source 21 is converted to the frequency modulated RF signal by the processor 22 and supplied to the laser driving circuit 23. The driving circuit 23 magnitude modulates an output light of a laser diode attached to the optical head 16 in accordance with the input RF signal and irradiates onto the disc 1 while a recording/reproducing change-over signal (j) supplied from the recording/reproducing control circuit 26 is at a high level H (or a low level L), thereby recording information onto the disc 1.

In reproduction, on one hand, the low-power light beam of a constant intensity is irradiated onto the disc 1 by the laser driving circuit 23 while the change-over signal (j) from the control circuit 26 is at a low level L (or at a high level H). Thus, the information signal recorded on the disc 1 is detected by way of the I-V conversion processor 30 and frequency-demodulated by the reproduced signal processor 31 and displayed as a reproduced image on the TV receiver 32.

The processor 30 converts the currents detected by a pair of photo cells 14 and 15 of the optical head 16 to voltages. The high frequency component (b) in the detected information signal is supplied to the processor 31 and detecting circuit 36, the middle frequency component (a) is supplied to the demodulator 35, and low frequency components (c) to (f) are supplied to the control circuits 33 and 34.

Figure 4:
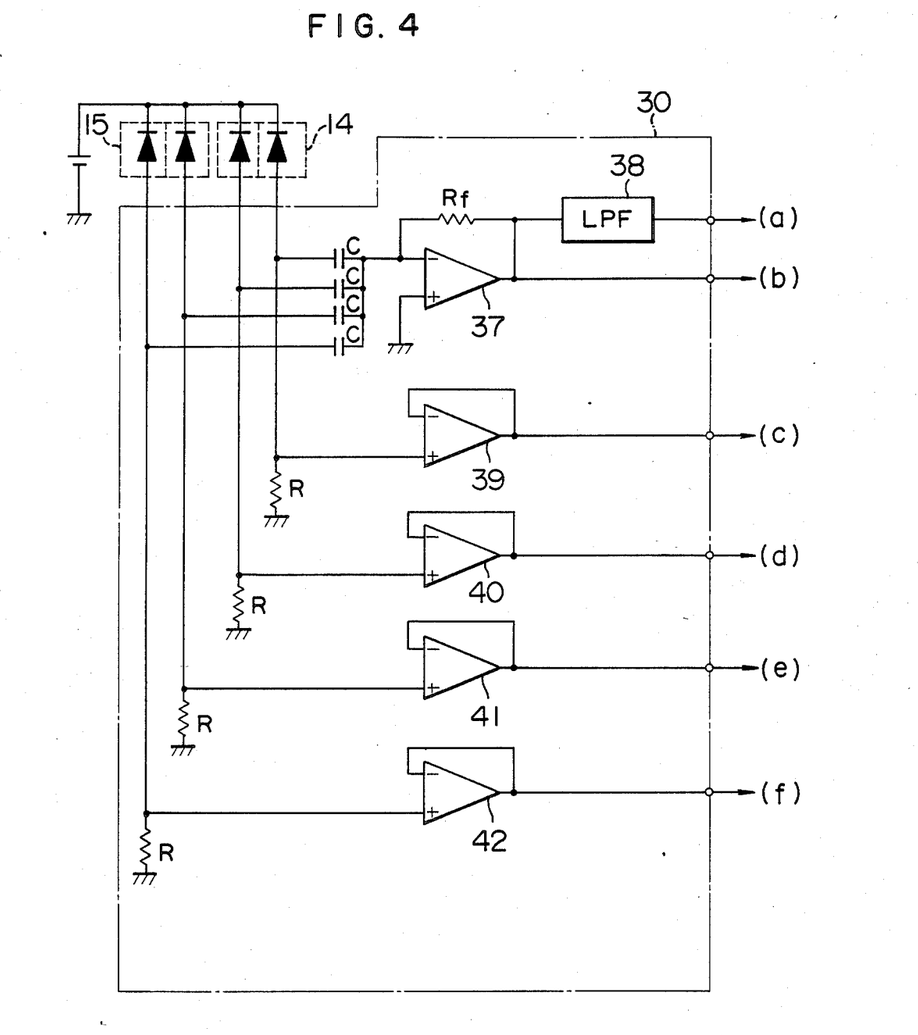
FIG. 4, is a circuit diagram of an I-V conversion processor.

FIG. 4 is a circuit diagram showing a practical example of an I-V conversion processor to convert a signal detected by a pair of photo cells of the optical head to a voltage from a current.

The detection currents of the pair of photo cells 14 and 15 for detection of the focusing error and tracking error are divided into the high frequency components and low frequency components by resistors R and capacitors C. The high frequency components are converted to a voltage by an amplifier 37 through the capacitors C and thereafter it becomes an RF signal (b). In addition, the high frequency component is also transmitted through an LPF (low-pass filter) 38 and becomes an address signal demodulating signal (a). The low frequency components are respectively converted to voltages by the resistors R and thereafter they are transmitted through buffer amplifiers 39, 40, 41, and 42 and become signals (c) to (f) for focusing control and tracking control.

The case of recording the video signal will now be described.

Figure 5:
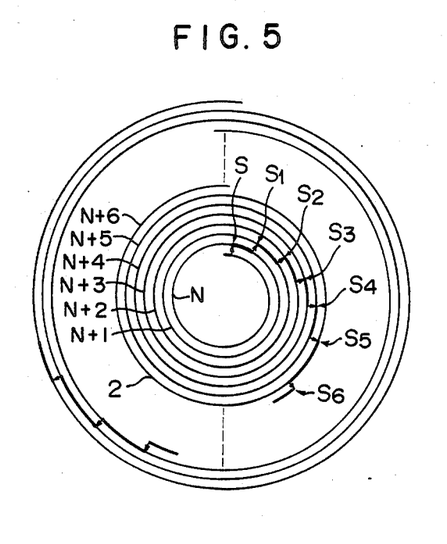
FIGS. 5, 8, 11, and 14 are diagrammatical views showing the states whereby the light spot jumps the tracks.

In FIG. 3, after the number N of the track section on the disc 1 from which the recording is started and the number $N_0$ of track sections on which the recording is performed were inputted as recording areas from the keyboard 24 to the system control circuit 25, the circuit 25 first checks at a high speed to see if all of the recording areas designated are in the unrecorded condition or not in accordance with the present invention prior to starting the recording. In this case, a jump pulse (k) is inputted from the system control circuit 25 to the tracking control circuit 34 at the period $T_1$ shorter than the rotational period T of the disc, for example, at the period of about 1 to 2 msec. Thus, the optical head 16 jumps from the N-th track section to the (N+1)-th track section and, as shown in FIG. 5, an optical spot S moves at a high speed in a manner such as to jump from the N-th track section to the (N+1)-th track section as indicated by spots S1 to S6. During this interval, the presence or absence of an output of the reproduced RF signal detecting circuit 36 are checked. It is assumed that $(N_0-1)$ track jump pulses are generated.

Further, the optical head 16 and the objective lens 10 move in the radius direction of the disc 1. And, as the disc 1 rotates, the optical spot S moves on the disc 1 as shown in FIG. 5 in a sequential and stepwise manner.

Figure 6:
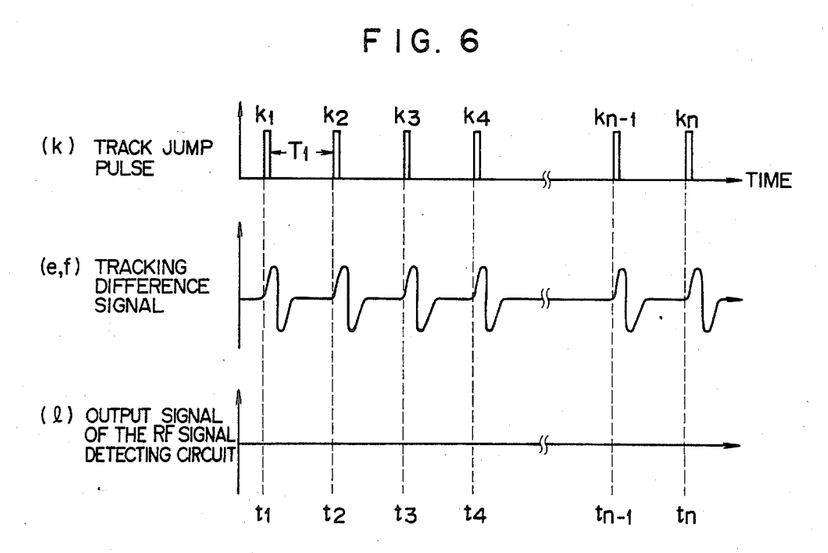
FIGS. 6, 9, 12, and 15 are timing charts of a track jump pulse and an output signal of an RF signal detecting circuit.

FIG. 6 shows timing charts of signals in respective sections in this case and shows the case where all of the recording areas designated are in the unrecorded condition and a signal (l) is not outputted as an output of the detecting circuit 36 in the recording areas among the track jump pulses $k_1, k_2, k_3, k_4, \ldots$ generated at times $t_1, t_2, t_3, t_4, \ldots$ and the pulses $k_{n-1}$ and $k_n$ generated at times $t_{n-1}$ and $t_n$.

As shown in FIG. 6, the light spot is deviated from the track each time the track jump pulse (k) is generated, so that a tracking difference signal (e, f) largely fluctuates.

Figure 7:
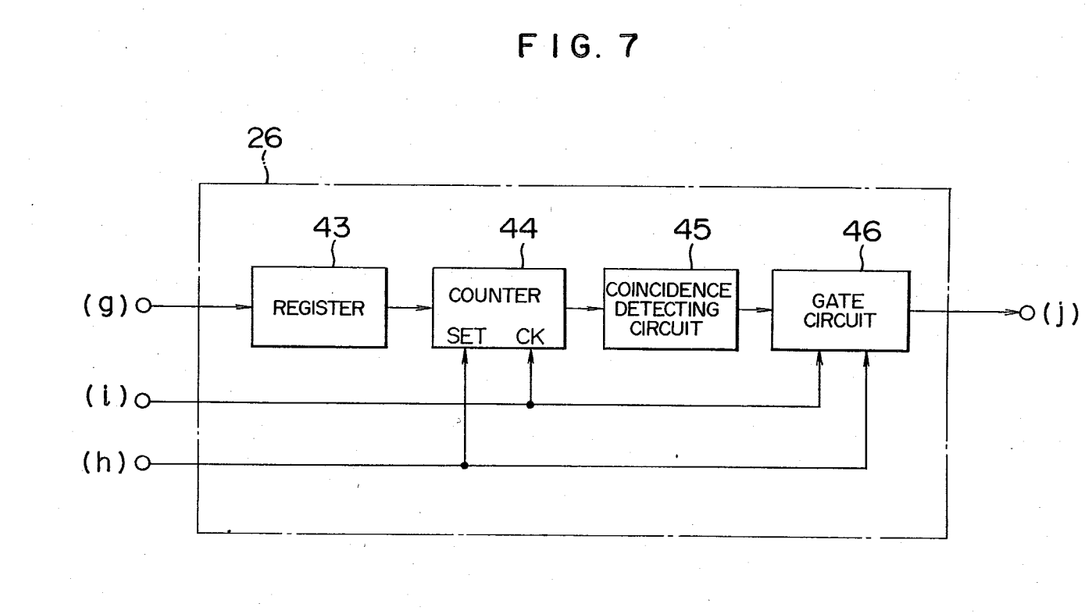
FIG. 7 is a block diagram of a recording control circuit.

After it was determined that the signal is not recorded in the recording areas designated, as shown in FIG. 7, a signal (g) is supplied from the system control circuit 25 to a register 43 in the recording/reproducing control circuit 26 and the number $N_0$ of recording track sections is preset to the register 43.

After the system control circuit 25 decided that the track section which is at present being traced is the designated recording start track section, it outputs an REC trigger pulse (h) to a down-counter 44 and a gate circuit 46. The recording track section number $N_0$ preset into the register 43 is stored into the down-counter 44 by the REC trigger pulse (h).

On the other hand, after the REC trigger pulse (h) was inputted, the gate circuit 46 sets the recording/reproducing change-over signal (j) at a high (or low) level H (or L) synchronously with the first recording position matching mark detecting pulse (i) which is sent from the photo sensor 17 through the waveform shaping circuit 18.

The pulse (i) is inputted to a clock terminal CK of the down-counter 44. When the disc rotates $N_0$ times and the signal is recorded only in the $N_0$ track sections, a value of the down-counter 44 becomes "0". When it is detected that the value of the down-counter 44 becomes "0", a coincidence detecting circuit 45 outputs a reset pulse to the gate circuit 46 and switches the signal (j) at a low (or high) level L (or H), thereby to stop the recording.

Figure 8:
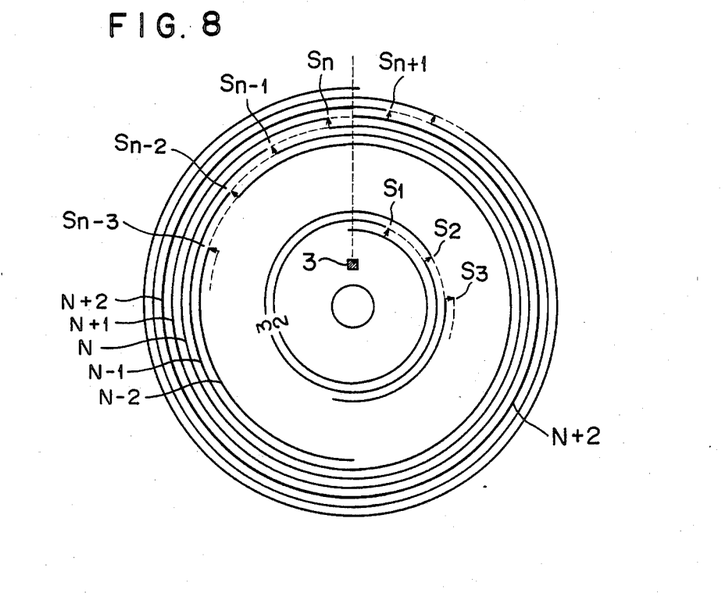
Figure 9:
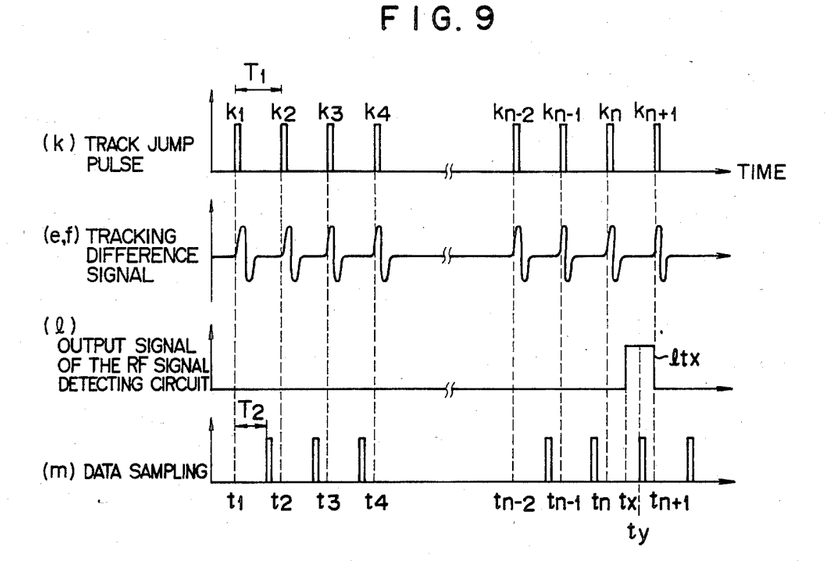

FIGS. 8 and 9 show an example in the case where the video signal has been recorded in the track areas designated.

The system control circuit 25 supplies the track jump pulse (k) to the tracking control circuit 34 at times $t_1$, $t_2$, $t_3$, $t_4$, . . . at the period $T_1$ in a manner similar to the above and checks the output of the reproduced RF signal detecting circuit 36 while moving the light spot $S_N$ ($N=1$, . . .) from the track section N to the track section (N+1) at a high speed as shown in FIG. 8.

FIG. 9 is a diagram showing timing charts in this case. The microcomputer (not shown) provided in the system control circuit 25 samples the output signal (l) of the detecting circuit 36 at time points which are delayed by only time $T_2$ from the track jump pulses $k_1$, $k_2$, $k_3$, . . . which are generated at times $t_1$, $t_2$, $t_3$, $t_4$, . . . shown in FIG. 9(m).

In this case, as shown in FIG. 8, a signal ($l_{tx}$) is outputted to the detecting circuit 36 in the track section (N+2) at time $t_x$ of the track area designated. In the case where it is detected by the system control circuit 25 by the signal ($l_{tx}$) at time $t_y$ that the video signal has already been recorded in the track section (N+2), the circuit 25 stops generating the track jump pulse. Thus, the track jump is stopped and it is informed to the user by a display device 50 that the video signal has already been recorded in a part of the track area designated. The display device 50 may be merely a lamp or may display the track number of the track section (N+2) or error message. In this case, on one hand, a still picture can be also reproduced by the optical recording/reproducing apparatus with respect to the recorded track section (N+2). The TV receiver 32 may be used as the display device 50.

Figure 10:
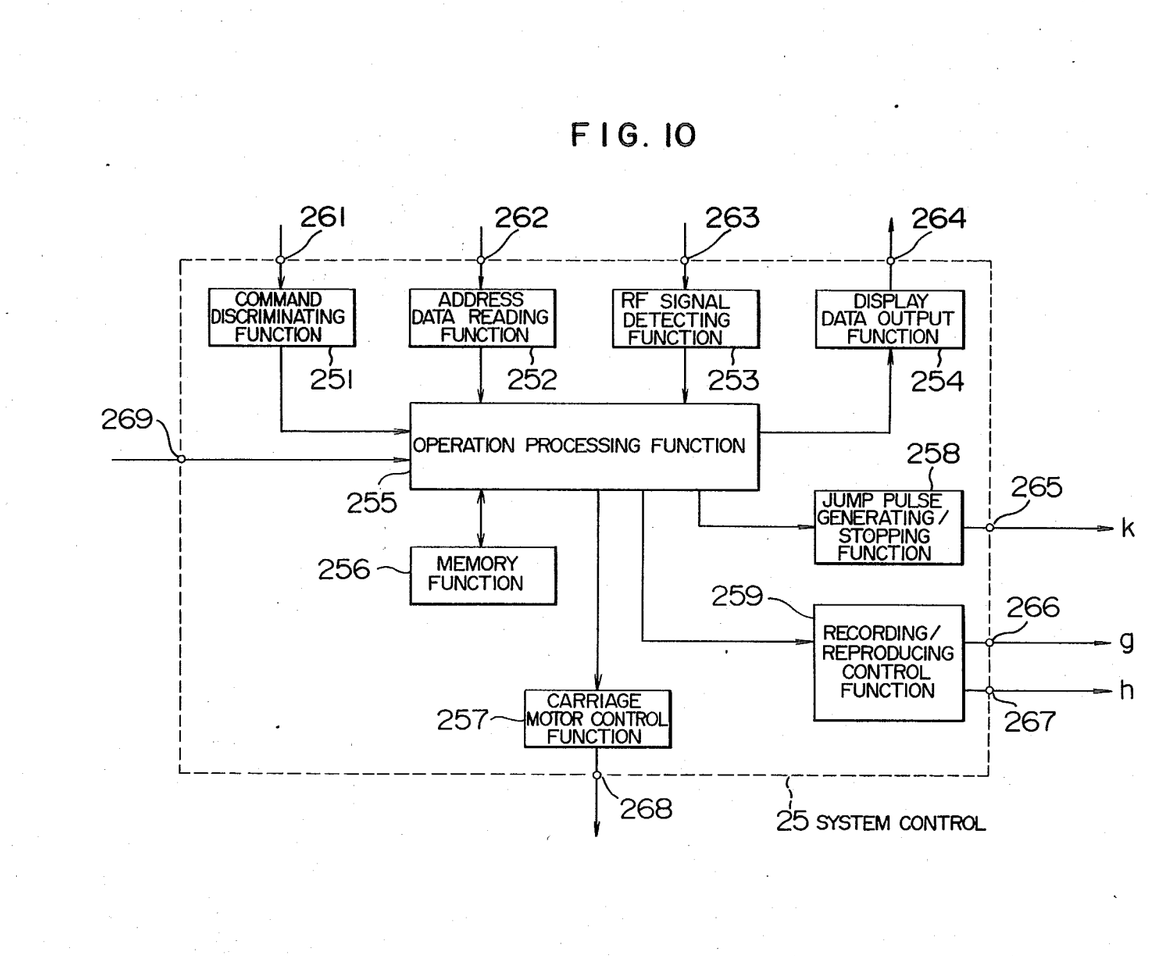
FIG. 10 is a functional block diagram of a system control circuit.

FIG. 10 shows functions of the system control circuit 25. The circuit 25 has a command discriminating function 251, an address reading function 252, an RF signal detecting function 253, a display data output function 254, an operation processing function 255, a memory function 256, a carriage motor control function 257, a jump pulse generating/stopping function 258, and a recording/reproducing control function 259. A terminal 261 is connected to the keyboard 24. A terminal 262 is connected to the address demodulator 35. A terminal 263 is connected to the RF signal detecting circuit 36. A terminal 264 is connected to the display device 50. A terminal 265 is connected to the tracking control circuit 34. Terminals 266 and 267 are connected to the recording control circuit 26. A terminal 268 is connected to the driving circuit 29. A terminal 269 is connected to the waveform shaping circuit 18.

Figure 11:
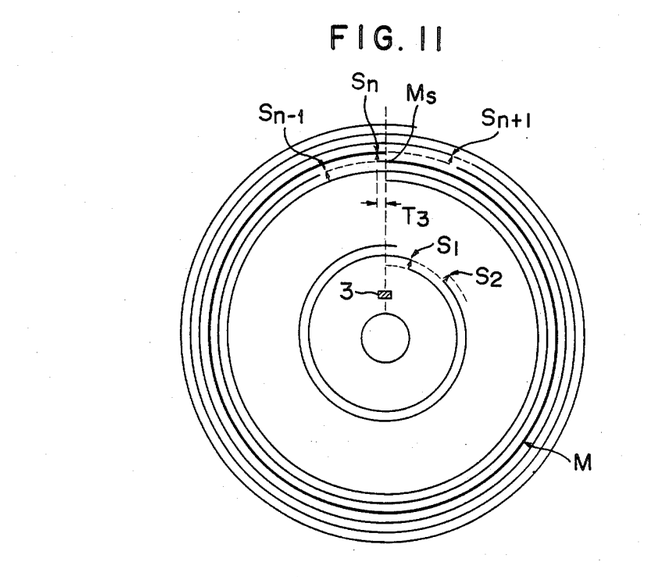
Figure 12:
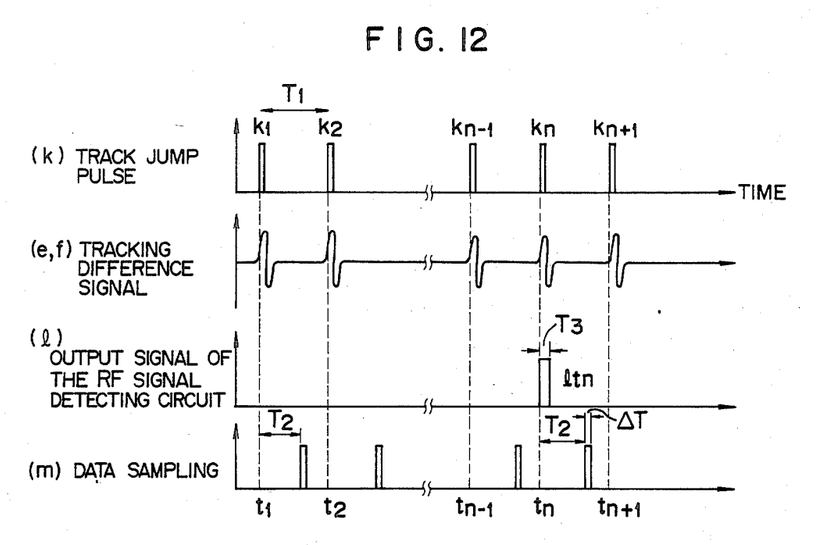

FIGS. 11 and 12 are diagrams for explaining the operating state of another method of checking the recording track area designated, namely, of another embodiment of the present invention.

Assuming that the rotational period of the disc is T and the period of generation of the track jump pulse (k) is $T_1$, the number N of track jump times per rotation of the disc can be expressed by $$N = T/T_1$$

The recording of the video signal is started from a position $M_s$ in synchronism with the recording position matching mark 3 as shown in a track section M in FIG. 11. On the other hand, in the case where the light spot $S_n$ of the N-th track jump is located at a timing which is preceding from the mark 3 by only a period $T_3$ (where, $T_3$ is shorter than $T_2$) as shown in FIG. 11 or where the timing of the light spot $S_n$ of the track jump coincides with the position of the mark 3, no signal is outputted from the RF signal detecting circuit 36 for a data sampling period $\Delta T$ of the system control circuit 25 as shown in a signal $l_{tn}$ in FIG. 12. Consequently, it is also considered that the recorded track M cannot be detected.

In this case, the circuit 25 does not generate the N-th track jump signal.

In the case where the number of times N and the track jump period $T_1$ were selected so as to satisfy the relation $$T - NT_1 > T_2$$

it is possible to check N times per rotation of the disc. Thus, the omission of the detection of the recorded track M can be prevented. If the relation $$T - NT_1 < T_2$$

is satisfied, the detection of the recorded track M will be omitted. Therefore the number of track jump times is set to (N−1) in such a case.

In the case where the time difference $T_3$ is longer than the period of time $T_2$ from the output of the track jump pulse until the sampling of the output of the detecting circuit 36, even if the N-th track jump is not stopped, the omission of the detection of the recorded track M will be avoided.

Figure 13:
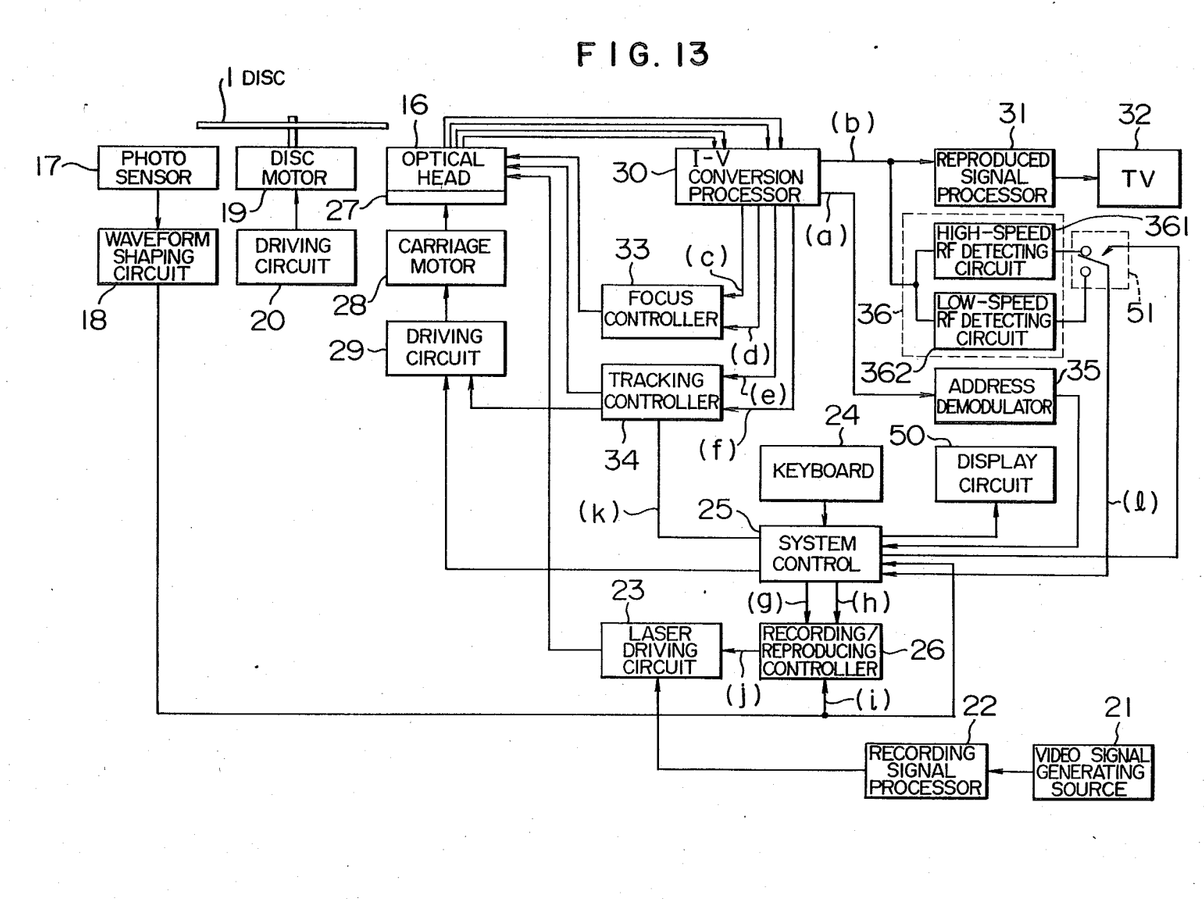
FIG. 13 is a block diagram of the second embodiment of the invention.
Figure 14:
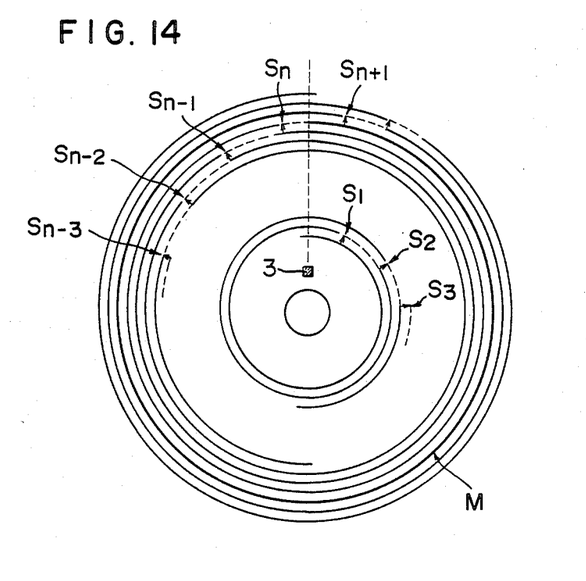
Figure 15:
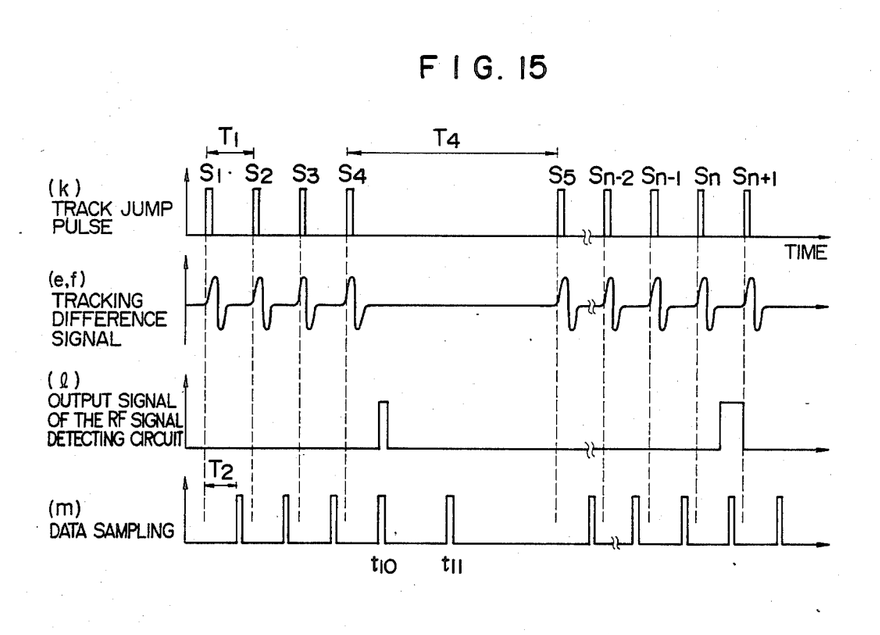

In addition, as shown in FIG. 13, in place of the RF signal detecting circuit 36, for example, if a low-speed RF signal detecting circuit 362 having a low response speed and a high-speed RF signal detecting circuit 361 having a high response speed are used, and when the track jump pulses are generated as shown in an example of FIGS. 14 and 15 and the light spot is sequentially moved at a high speed from a track section to other track sections, a switch 51 is switched to the side of the high-speed detecting circuit 361 and its output is checked by the system control circuit 25. If a signal is detected as the output of the detecting circuit 361 at time $t_{10}$ as shown in FIG. 15, the movement of the light spot is temporarily interrupted after time $t_{10}$ and the operating mode is switched to the still picture reproducing mode whereby the signal of the same track section is repeatedly reproduced, and at the same time the switch 51 is switched to the side of the low-speed detecting circuit 362. Thereafter, the presence or absence of the reproduced RF signal is detected at time $t_{11}$. If the reproduced RF signal is not detected at time $t_{11}$, it is decided that the malfunction has occurred due to the noise or the like. The operation is returned to the mode whereby the light spot is moved at a high speed and the switch 51 is also switched to the side of the high-speed detecting circuit 361. A period of time $T_4$ when the outputs of the circuits 361 and 362 are checked in the still picture reproducing mode is preferably set to a time over the time period T of one rotation of the disc, and by checking the output voltage a few times during this period of time, the probability of erroneous detection can be reduced. If the RF signal is also detected at time $t_{11}$, it is determined that the RF signal detected at time $t_{10}$ is not the noise. In the embodiment shown in FIG. 13, the system control circuit 25 has the function to change-over the switch 51.

Figure 16:
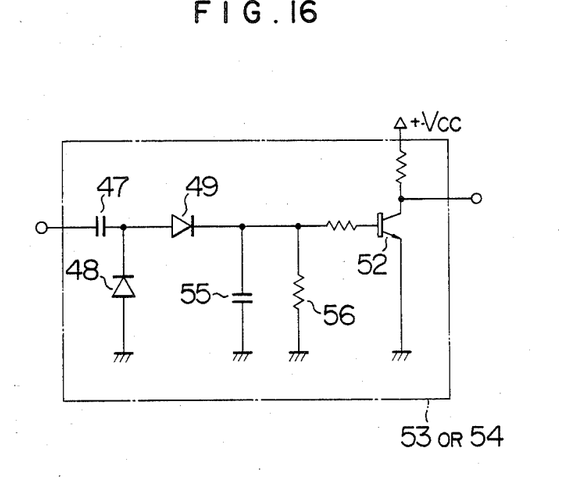
FIG. 16. is a circuit diagram showing a practical example of the RF signal detecting circuit.

FIG. 16 is a circuit diagram showing a practical example of the RF signal detecting circuit. The RF signal (b) outputted from the I-V conversion processor 30 is inputted to a terminal 100 and rectified and smoothed by a voltage multiplying rectifier composed by capacitors 47 and 55, diodes 48 and 49, and a resistor 56. Thereafter, this signal is inputted to a level detecting circuit consisting of a transistor 52, by which the presence or absence of the RF signal is detected. The response speed of the detecting circuit is mainly determined by the capacitor 55 and the resistor 56. By changing the time constant thereof, the detecting time of the RF signal can be changed.

As described above, according to the present invention, in the optical recording/reproducing apparatus, the video signal is recorded after preliminarily checking the track area which has preliminarily been designated without an error. Therefore, it is prevented that the signal is erroneously overlappingly recorded. In addition, the previous check is performed by jumping the light spot from a track to other tracks at a high speed, so that the time required for the previous check is also reduced.

On one hand, in the case where the recorded track was detected when the light spot is moving, the movement of the spot is stopped at that position and the fact that the video signal has already been recorded in this track section can be also informed to the user. Moreover, there is also an effect such that the recorded track number can be informed as well.

What is claimed is:

1. A recording/reproducing apparatus of an optical disc for recording an information signal onto information tracks formed on the optical disc and for reproducing the information signal recorded on the optical disc, comprising:
   (a) disc driving means for rotating the optical disc at a period T;
   (b) an optical head mounted on a carriage and having a laser diode, an optical lens, photoelectric converting means, and actuator means for the optical lens, said optical head irradiating a laser beam emitted from said laser diode onto the optical disc and converting the laser beam reflected by the optical disc into an electrical signal;
   (c) laser driving means, electrically connected to said laser diode of said optical head, for supplying a recording current or a reproducing current to said laser diode;
   (d) signal detecting means, connected to said optical head, for detecting the presence or absence of the electrical signal derived by said optical head;
   (e) designating means for setting the operating condition of said recording/reporoducing apparatus into either a recording mode which includes a prerecording mode or a reproducing mode, said designating means enabling designation of a plurality of N track sections on which the information signal is to be recorded when the recording mode is selected;
   (f) optical head moving means for moving said optical head in the radial direction of the optical disc and for moving said optical head onto a first track section among said plurality of N track sections designated by said designating means;
   (g) system control means having at least jump pulse generating/stopping means and being connected to said signal detecting means, said jump pulse generating/stopping means generating a plurality of pulse signals of a period $T_1$ which is shorter than the rotational period T of the optical disc during the prerecording mode after the recording mode is selected by said designating means and stopping the generation of the pulse signals when said RF signal detecting means detects the electrical signal obtained by said optical head;
   (h) tracking control means responsive to the pulse signals from said jump pulse generating/stopping means of said system control means for controlling said actuator means of said optical means in accordance therewith, said tracking control means enabling sequential movement of the position of the optical lens in a stepwise manner from the first track section of said plurality of N track sections to track sections adjacent said first track section in accordance with each of the pulse signals; and
   (i) recording/reproducing control means, connected to said system control means and said laser driving means, for enabling a reproducing current to be supplied to said laser diode from said laser driving means while said jump pulse generating/stopping means of said system control means generate the pulse signals of the period $T_1$ during the prerecording mode.

2. A recording/reproducing apparatus according to claim 1, further comprising:
   (j) address demodulator means responsive to the electrical signal obtained by said optical head for demodulating an address signal of the track section from the electrical signal and for supplying said address signal to said system control means; and
   (k) display means, connected to said system control means, for displaying at least the address signal supplied to the system control means from said address demodulator means.

3. A recording/reproducing apparatus according to claim 1, wherein said tracking control means further enables positioning of the laser beam onto the information track in accordance with the electrical signal obtained by said optical head.

4. A recording/reproducing apparatus according to claim 1, wherein said jump pulse generating/stopping means stops the generation of the pulse signals after it has generated the (N−1) pulse signals.

5. A recording/reproducing apparatus according to claim 1, wherein the number of pulse signals which are generated by said jump pulse generating/stopping means is (N−1).

6. A recording/reproducing apparatus according to claim 1, wherein said signal detecting means has a first detecting circuit of a high response speed and a second detecting circuit of a low response speed.

* * * * *